(12) United States Patent
Blau et al.

(10) Patent No.: US 8,387,585 B2
(45) Date of Patent: Mar. 5, 2013

(54) PISTON OF AN INTERNAL COMBUSTION ENGINE WITH AN INCREASED INCLINATION OF THE BOX WALLS OF THE PISTON

(75) Inventors: Alfred Alexander Blau, Nekarsulum (DE); Ralf Buschbek, Neudenau (DE); Matthias Fahr, Bad Fredrichshall (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 323 days.

(21) Appl. No.: 12/600,321

(22) PCT Filed: Jun. 14, 2008

(86) PCT No.: PCT/EP2008/004806
§ 371 (c)(1),
(2), (4) Date: Nov. 16, 2009

(87) PCT Pub. No.: WO2009/006978
PCT Pub. Date: Jan. 15, 2009

(65) Prior Publication Data
US 2010/0147251 A1 Jun. 17, 2010

(30) Foreign Application Priority Data
Jul. 6, 2007 (DE) .......................... 10 2007 031 581

(51) Int. Cl.
*F02F 3/00* (2006.01)
(52) U.S. Cl. ........... 123/193.6; 92/327; 92/208; 92/238; 92/232; 92/233
(58) Field of Classification Search ............... 123/193.6; 92/327, 208, 238, 232, 233
See application file for complete search history.

(56) References Cited

U.S. PATENT DOCUMENTS

| | | | | |
|---|---|---|---|---|
| 4,359,973 A | * | 11/1982 | Shimada | 123/41.35 |
| 4,856,417 A | * | 8/1989 | Ishikawa | 92/233 |
| 5,299,490 A | * | 4/1994 | Harrer et al. | 92/208 |

(Continued)

FOREIGN PATENT DOCUMENTS

| DE | 10142980 A1 | 3/2003 |
|---|---|---|
| DE | 10145589 A1 | 4/2003 |

(Continued)

OTHER PUBLICATIONS

International Search Report for PCT/EP2008/004806 dated Sep. 10, 2008.

(Continued)

*Primary Examiner* — Nathaniel Wiehe
*Assistant Examiner* — James Kim
(74) *Attorney, Agent, or Firm* — Young, Basile, Hanlon & MacFarlane P.C.

(57) ABSTRACT

A piston of an internal combustion engine has a piston crown with annular grooves and a shaft part disposed on the piston crown. The shaft part has bearing shaft wall sections which are connected to one another via inclined connecting walls which are retracted with respect to the outer diameter of the piston. Piston-pin bosses for accommodating a piston pin are disposed in connecting walls. The connecting walls are retracted at such an angle that, in progressing from the lower edge over an intermediate region which lies further back than the lower edge, into an end region which lies further back than the intermediate region the connecting walls to over flush into a hub supporting region below the piston crown.

6 Claims, 3 Drawing Sheets

U.S. PATENT DOCUMENTS

| | | | |
|---|---|---|---|
| 5,487,364 A * | 1/1996 | Takeda et al. | 123/193.6 |
| 6,112,715 A * | 9/2000 | Nigro et al. | 123/279 |
| 6,152,017 A * | 11/2000 | Harrer et al. | 92/237 |
| 6,345,569 B1 * | 2/2002 | Take et al. | 92/233 |
| 6,357,341 B1 * | 3/2002 | Watanabe et al. | 92/238 |
| 2005/0229897 A1 * | 10/2005 | Zoller | 123/298 |

FOREIGN PATENT DOCUMENTS

| | | |
|---|---|---|
| EP | 0430362 A | 5/1991 |
| EP | 0838587 A | 4/1998 |
| EP | 0877160 A | 11/1998 |
| JP | 2002317691 A | 10/2002 |
| WO | 2005078321 A | 8/2005 |

OTHER PUBLICATIONS

Written Opinion of the International Search Authority for PCT/EP2008/004806, Dated Sep. 10, 2008.

* cited by examiner

PISTON OF AN INTERNAL COMBUSTION ENGINE WITH AN INCREASED INCLINATION OF THE BOX WALLS OF THE PISTON

BACKGROUND

The invention relates to a piston of an internal combustion engine that has a piston crown with annular grooves and a skirt part which is disposed on the piston crown, where the skirt part has load-bearing skirt wall sections, and the load-bearing skirt wall sections are connected to one another via inclined connecting walls which are retracted with respect to the outer diameter of the piston.

A generic piston with the above-described features is known from DE 101 45 589 B4. A piston of this type is substantially improved with respect to its parameters, in comparison with pistons of the type from which the piston described in DE 101 45 589 B4 is derived. However, it has emerged that, in spite of these improved parameters, a piston of this type requires further improvement with respect to its operation in the cylinder of the internal combustion engine. This improvement has become necessary because of the constantly increasing operating requirements for an internal combustion engine, in particular for vehicles, with regard to its environmental compatibility (specifically fuel consumption and emission of pollutants, which should both be minimized) and also durability and generation of noise.

It would be desirable to improve a generic piston with a view to improving its parameters during operation in the internal combustion engine, above all its durability and generation of noise and, through its use in the internal combustion engine, to improving its parameters in turn, in particular with respect to fuel consumption and emission of pollutants.

SUMMARY

In accordance with the invention, the retracted and inclined connecting walls are inclined at such an angle (inclination in reference to a plane running through the axis of the piston stroke) that, in progressing from their lower edge over an intermediate region which lies further back than the lower edge, the connecting walls go over flush into a boss-supporting region below the piston crown in their end region which lies further back than the intermediate region. In combination with the curvature, specifically a convex or concave curvature, of the box walls of the piston in the horizontal sectional plane below the piston crown (also called the base plate) and specifically in combination with a domed boss face, internal stresses in the piston can be advantageously further reduced.

Through this progression of the box walls, viewed from below looking upwards and referenced to a plane running through the axis of the piston stroke, the inclination of the connecting walls (also called box inclination) is clearly increased, so that the connecting wall (i.e., box wall) and the boss support in the upper region of the boss support are at least as far as possible, specifically completely flush. As a result, stresses at the piston crown are clearly reduced, which leads to an increase in durability. Furthermore, the weight of the piston can be further reduced, resulting in a positive reduction in noise.

As a result of the design layout of the piston, the load capability of the piston is improved substantially, i.e., the piston is improved with respect to its permanent resistance with regard to thermal or mechanical loads, i.e., because of present-day demands on internal combustion engines, the piston is considerably more able to meet these demands and can withstand correspondingly more demands.

In a refinement of the piston, there are no undercuts in a piston interior area. This means that undercuts on the interior piston shape are avoided. The advantageous result compared with known pistons is a simpler casting tool design. Furthermore, avoiding undercuts allows more intensive cooling of the casting tool, resulting in increased boss load capacity for the piston during operation in the internal combustion engine. Furthermore, cost reductions accrue from the simpler casting tool design.

In another refinement of the piston, the load-bearing skirt wall sections are configured asymmetrically with reference to a piston pin axis, such that the one skirt wall section in a radial progression goes over later into the retracted connecting wall than the skirt wall section lying opposite thereto. This means that in the case of the piston, asymmetrical skirt contact arc angles are provided. These asymmetrical skirt contact arc angles result in an advantageous manner in reduced friction and weight so that noise during piston operation in the internal combustion engine is also clearly reduced through this measure.

In another refinement of the piston, the thickness of the piston crown decreases, running from the direction of a piston stroke axis towards the outside. As a result of this decreasing crown thickness in the direction of the running surface, there is a reduction in weight without sacrificing piston strength and, thus, a further reduction in noise during piston operation in the internal combustion engine.

In another refinement of the piston, an open space extending into the piston interior is provided behind the ring belt so that an increased ring belt angle in the area of the weight pockets is given thereby. Through this design, the thermal flow in the ring belt area can be optimized and, as a result, piston temperature can be lowered. As a result, piston durability is improved during internal combustion engine operation. Moreover, expanded degrees of freedom for groove reinforcement are given as a result.

In another refinement, the inclination of the open space is more than 30° relative to an axis parallel to the piston stroke axis. It was known previously not to make this inclination more than 30°, also relative to an axis parallel to the piston stroke axis, since it had negative effects on the strength of the piston, or created difficulties when producing the piston. In conjunction with this design feature, namely that the connecting walls are inclined at such an angle that, in progressing from their lower edge over an intermediate region which lies further back than the lower edge, said connecting walls go over flush into a boss supporting region below the piston crown in their end region which lies further back than the intermediate region; manufacturing technology makes it possible to realize an open space with an inclination of greater than 30°. The additional result of this is that the inclination of the connecting walls is at an angle that is similarly more than 30°, also relative to an axis parallel to the piston stroke axis.

In another refinement of the piston, the surface of the piston skirt, i.e., of the load-bearing skirt wall sections, is asymmetrical in the direction of the piston stroke axis, specifically asymmetrically crowned. This has the advantage that because of the asymmetry of the piston skirt, more precisely, of the load-bearing piston skirt sections that are supported against the interior of the cylinder of the internal combustion engine during piston operation, the skirt sections can adapt to the deformations of the piston in its upward and downward motion so that frictional forces are reduced as a consequence. As a result of the forces acting on the piston during operation in the internal combustion engine (specifically as a result of the forces acting from below through the connecting rod and the crankshaft and the forces acting from produced by combustion pressure and thermal deformation), deformation of the piston ensues so that now the asymmetrical piston skirt shape absorbs this deformation and the result is that the surfaces lying against each other (load-bearing piston skirt sections on the one hand and cylinder inner surface on the other) almost completely, or even completely, lie against each other so that the friction surfaces facing each other are conformed and no longer lie unevenly against each other as previously because of the deformation. Through the resulting asymmetrical running clearance of the piston skirt in the cylinder of the internal combustion engine, friction is reduced with resulting fuel savings, as well as optimized secondary piston motions that also result in reduced noise.

Owing to the previously stated measures that can be realized individually or in appropriate combinations, the weight of the piston can be reduced, the boss pressing can be heightened, piston skirt friction in the internal combustion engine cylinder can be reduced, resulting in further decreases in temperature and noise reduction when the piston is operating in the internal combustion engine cylinder.

BRIEF DESCRIPTION OF THE DRAWINGS

One aspect of a piston to which the invention is not restricted, is described hereinafter and explained using the figures in which.

DETAILED DESCRIPTION

Figure 1:
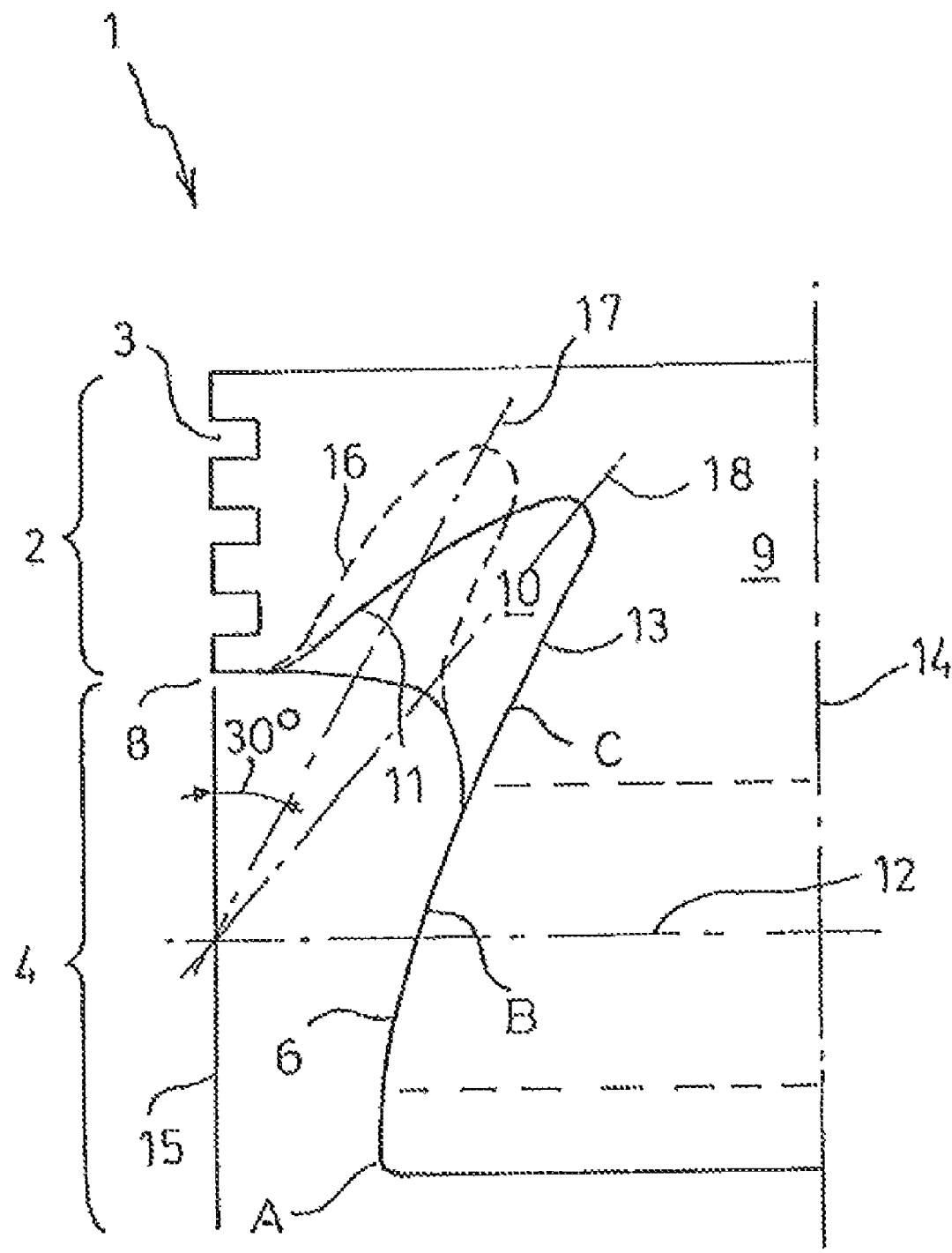
FIG. 1 is a longitudinal cross section through a piston.
Figure 2:
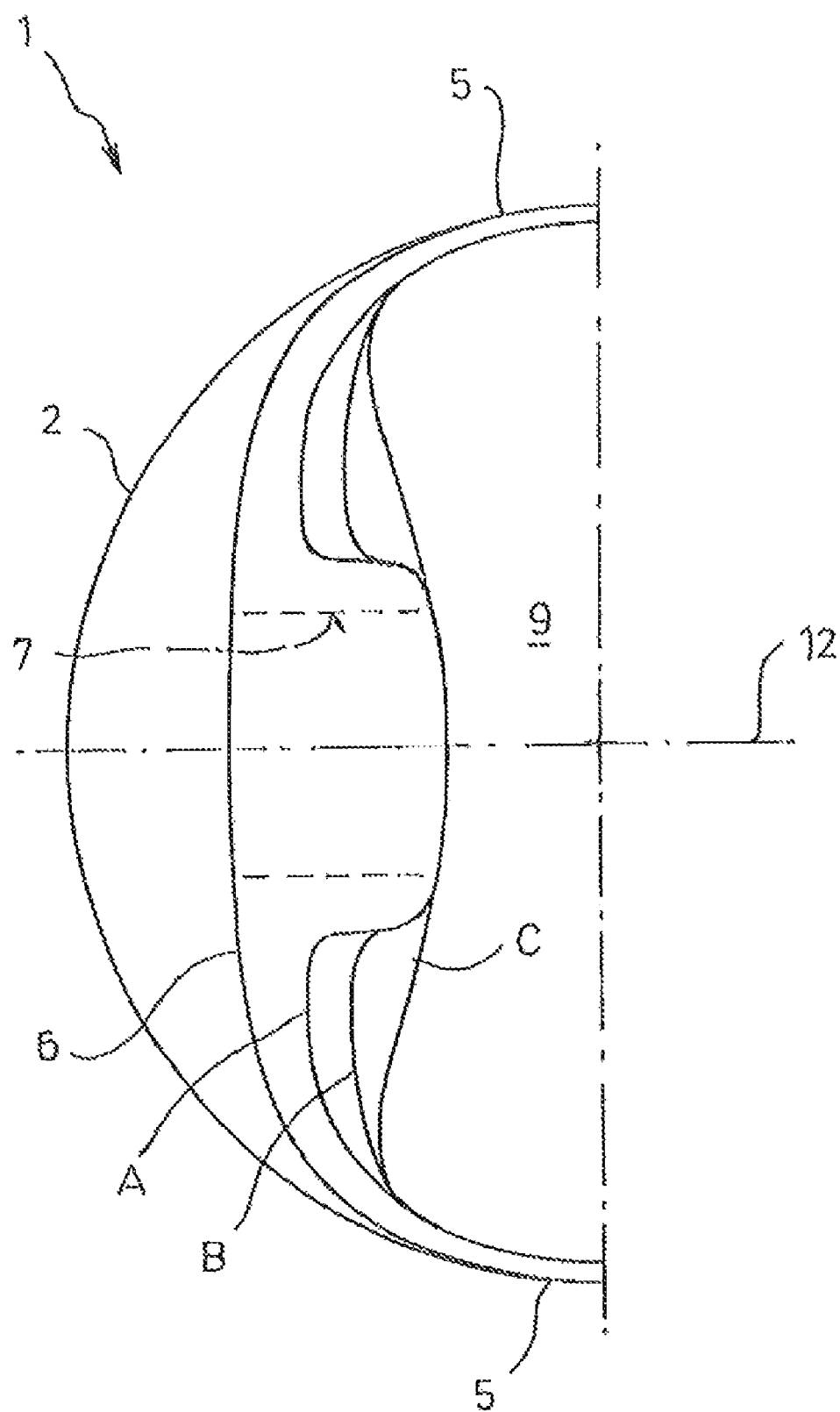
FIG. 2 is a cross-section through a piston.

FIGS. 1 and 2 show in respective cross-sections a piston 1 of an internal combustion engine that has a piston crown 2 with ring grooves 3 and a skirt part 4 disposed on the piston crown 2. The skirt part 4, in turn, has load-bearing skirt wall sections 5 wherein the load-bearing skirt wall sections 5 are connected through inclined connecting walls 6 that are retracted with respect to the outer diameter of the piston, wherein, furthermore, pin bosses 7 are disposed in the connecting walls 6 to accommodate a piston pin, not shown. The construction of the piston 1 shown in FIGS. 1 and 2 is symmetrical to the extent that two load-bearing skirt wall sections 5 lie opposite each other and the two inclined connecting walls 6 are located between the two oppositely disposed skirt sections that, for their part, are opposite each other and retracted with respect to the piston outside diameter. A lower edge 8 on the underside of the piston crown 2 goes over in the direction of a piston inner area 9 wherein an open space 10 that lies behind the ring belt is provided in this transition and which in turn has a delimiting wall. A pin axis is identified with the reference numeral 12. The connecting walls 6 are inclined at an angle such that in progressing from their lower edge A over an intermediate region B which lies further back than the lower edge A, the connecting walls go over flush into a boss-supporting area 13 below the piston crown 2 in the end region which lies farther back than the intermediate region. In this aspect, the open space 10 is selected such that the progression of the connecting wall 6 from A to C over the boss-supporting region 13 runs into the crown of the open space 10, and from there continues over the delimiting wall 11 in the direction of the lower edge 8 of the piston crown 2. This area and the progression of the connecting walls 6 is retracted compared with the piston outer diameter and goes over into the load-bearing skirt wall sections 5 that approximately match the outside diameter of the piston, wherein these skirt wall sections 5 carry the piston 1 in the cylinder of the internal combustion engine so that the piston 1 is supported by these load-bearing skirt wall sections 5 against the cylinder surfaces of the internal combustion engine and is guided thereby.

One of the features also clearly recognizable in FIG. 1 is that the inclination of the open space 10 is greater than 30° relative to an axis 15 parallel to the piston stroke axis 14. It was known previously to make this inclination not greater than 30°, also relative to an axis 15 parallel to the piston stroke axis 14, since this had negative effects on the strength of the piston or created difficulties during the production of the piston. This is made clear in FIG. 1 by a previous open space 16 (indicated by a broken line) and a former axis 17. This former axis 17 that runs through the former open space 16, effectively representing its longitudinal axis, has until now been inclined by no more than 30° to the axis 15. In conjunction with the design feature, namely that the connecting walls 6 are inclined at such an angle that, in progressing from their lower edge over an intermediate area which lies further back than the lower edge, the connecting walls go over flush into a boss-supporting area 13 below the piston crown 2 in the end area which lies farther back than the intermediate area, manufacturing technology makes it possible for the slope of the open space to be greater than 30°. The additional result of this is that the inclination of the connecting walls 6 has an angle that is also more than 30°, also relative to an axis parallel to the piston stroke axis. This is shown by the axis 18 that effectively represents the longitudinal axis of the open space 10, where now in an advantageous manner the slope of this new axis 18 is greater than 30° relative to the axis 15 parallel to the piston stroke axis 14.

Figure 3:
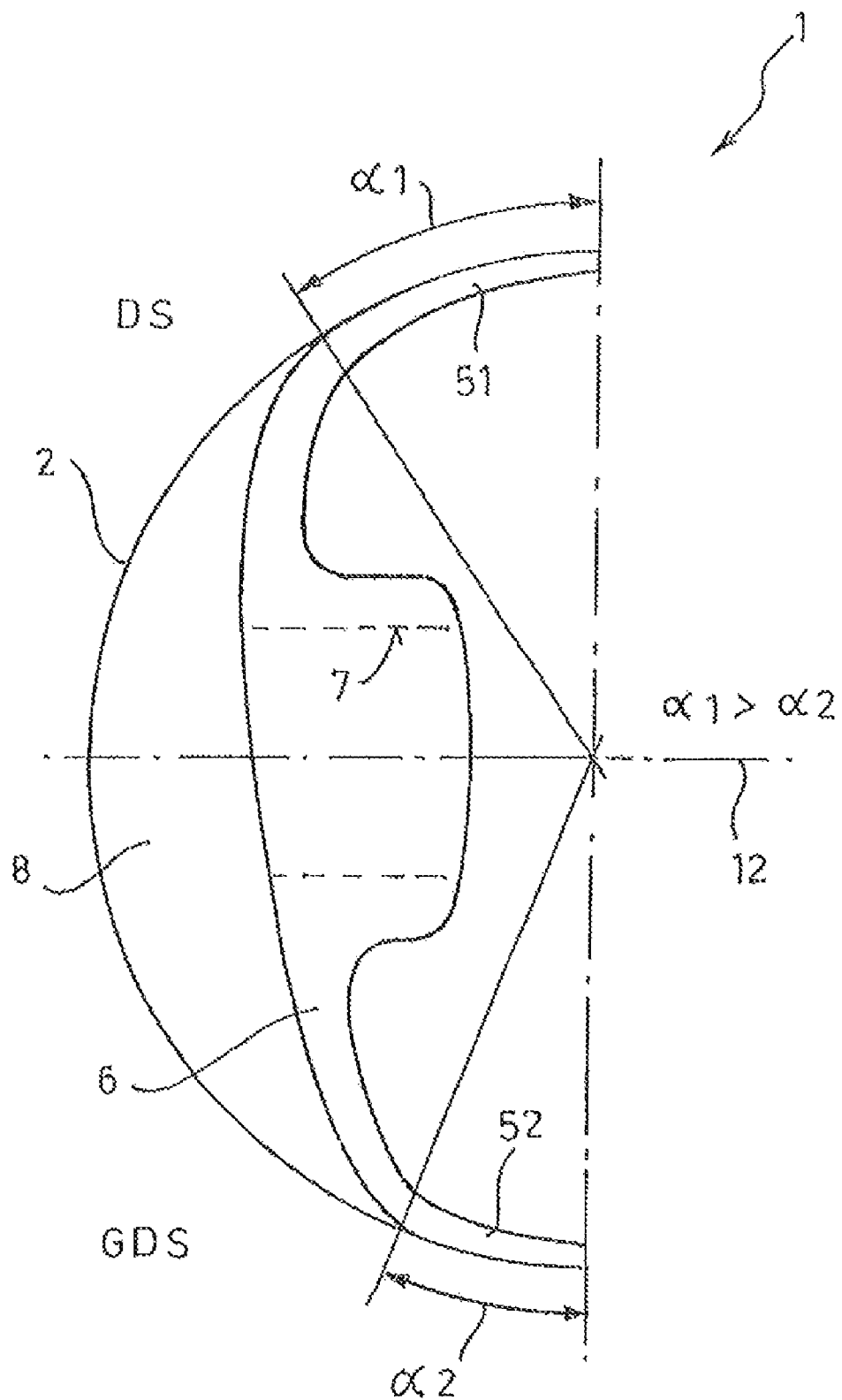
FIG. 3 is a further cross-section piston in accordance with the invention.

FIG. 3 shows a cross-section through the piston 1 where the area of the skirt part 4 below the lower edge 8 of the piston crown 2 can be seen. In this aspect, the load-bearing skirt wall sections 5 are formed asymmetrically in relation to the pin axis 12 such that the one skirt wall section (here 51) in its radial progression goes over later into the retracted connecting wall 6 than the skirt wall section (here 52) lying opposite thereto. Through this measure, the asymmetric skirt contact arc angle is realized so that: $\alpha_1 > \alpha_2$. The two angular ranges $\alpha_1$ and $\alpha_2$ are measured starting from an axis perpendicular to the pin axis 12 into the area in which the load-bearing skirt wall section 5 goes over into the retracted connecting wall 6.

The designation "DS" in FIG. 3 means pressure side, i.e., the side of the skirt that comes up against the cylinder wall in the combustion stroke. The designation "GDS" accordingly means counter pressure side.

The design of the top side of the piston crown described heretofore thus includes the general case that the top side of the piston crown may have an arbitrary shape or the inner side is designed such that the thickness of the piston crown decreases steadily from the inside (center at which the piston stroke axis is located) to the outside.

In conclusion, it should be pointed out that the individual measures stated previously (increasing the inclination of the connecting walls, avoiding undercuts in the piston interior shape, asymmetrical skirt contact arc angle, decreasing crown thickness in the direction of the running surfaces, increased ring belt angle in the area of the weight pockets, asymmetrically crowned shape of the piston pin bore) can not only be realized individually per se in a piston but also in part together or all together in a piston. Overall, these measures alone or in combination with each other result in the advantages described with respect to weight reduction, noise reduction, durability, reduced friction, cost reduction and the advantages that result therefrom when the piston is used in the internal combustion engine. The minimization of pollutants and reduced fuel consumption in the internal combustion engine can be taken as representative of all the other advantages.

The invention claimed is:

1. A piston of an internal combustion engine that has a piston crown with annular grooves defining a ring zone and a skirt part, comprising:
   the skirt part having load-bearing skirt wall sections connected through inclined connecting walls;
   the load-bearing skirt wall sections configured asymmetrically with reference to a piston pin axis such that the one skirt wall section in its radial progression passes into the connecting walls later than the skirt wall section lying opposite thereto;
   the load-bearing skirt wall sections connected by inclined connecting walls, each defining an open space, that is retracted with respect to the outer diameter of the piston;
   pin bosses for accommodating a piston pin disposed in the connecting walls;
   and the connecting walls inclined at such an angle that, in progressing from a lower edge over an intermediate region that lies further back than the lower edge, the connecting walls go over as far as at least flush with the pin bosses, into a boss supporting area below the piston crown in an end area that lies further back than the intermediate region.

2. The piston of claim 1, wherein there are no undercuts in a piston inner area.

3. The piston of claim 1, wherein the thickness of the piston crown in the region of the axis of the piston stroke is greatest and the thickness of the piston crown at the transition into the area lying behind the ring zone is least.

4. The piston of claim 1, wherein the open space extending into the piston crown is provided behind the ring zone.

5. The piston of claim 1, wherein an exterior surface of the piston pin bore in the pin boss is executed asymmetrically with respect to a piston pin bore axis.

6. The piston of claim 1, wherein the inclination of the open space is greater than 30°, referenced to an axis parallel to the axis of the piston stroke.

* * * * *